(No Model.)
A. RAMMEL.
BAKING PAN.
No. 489,985. Patented Jan. 17, 1893.
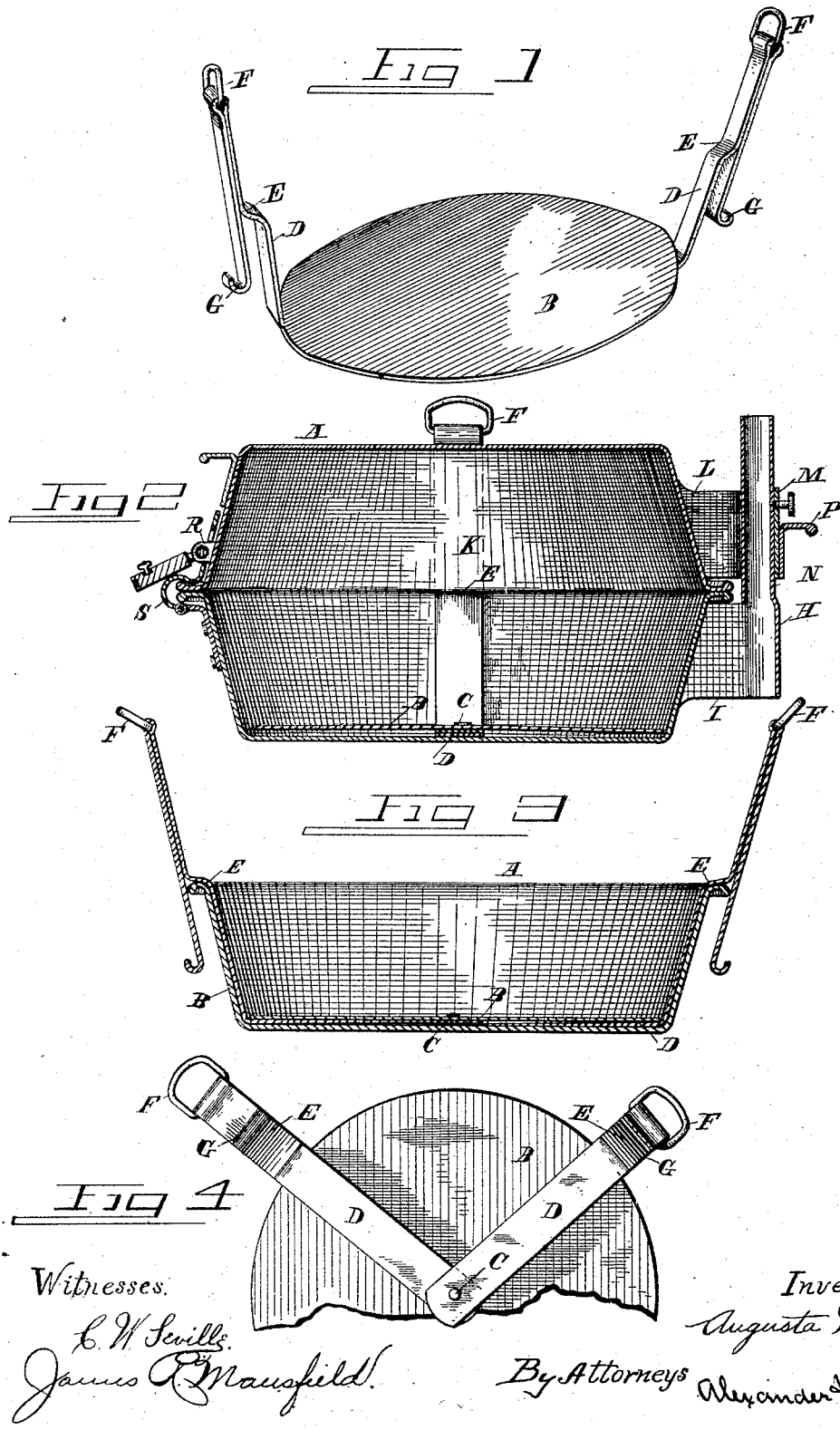
Witnesses.
C. W. Seville.
James R. Mansfield.
Inventor
Augusta Rammel.
By Attorneys
Alexander Howell

UNITED STATES PATENT OFFICE.

AUGUSTA RAMMEL, OF ALEXANDRIA, VIRGINIA.

BAKING-PAN.

SPECIFICATION forming part of Letters Patent No. 489,985, dated January 17, 1893.

Application filed April 15, 1892. Serial No. 429,294. (No model.)

*To all whom it may concern:*

Be it known that I, AUGUSTA RAMMEL, of Alexandria, in the county of Alexandria and State of Virginia, have invented certain new and useful Improvements in Baking-Pans; and I do hereby declare that the following is a full, clear, and exact description thereof, reference being had to the accompanying drawings, and to the letters of reference marked thereon, which form part of this specification.

This invention relates, generally, to improvements in baking pans, and particularly to pans for baking cake and bread of various kinds.

In the use of the ordinary baking pans much difficulty is experienced in removing the cake, or loaf after baking, as it is liable to adhere to the bottom and sides of a pan, and no instrument can be conveniently inserted to part it, especially at the bottom. An attempt has been made to provide for the removal of pies from a pie-baking plate, by providing the inside of the same with a knife, or parting attachment, pivoted at one end to the center of the plate, extending up the side and terminating in a suitable handle, by which it may be turned to part the pie from the bottom or sides, but such device afforded no means for lifting or removing the pie from the plate, and hence, did not obviate the danger of breaking.

One of the objects of my invention is to wholly obviate all danger of breaking the cake or loaf, and render its removal perfectly easy, by means of a device by which the cake or loaf may be lifted bodily from the pan, as more fully hereinafter set forth.

Another object of my invention is to provide for regulating the temperature at the top of the cake, independently of any appliances of the oven, by providing the pan with an adjustable cover, which may be elevated and retained in an adjusted position, over the pan, or closed down on it, over the cake when desired, and still another object of my invention is to provide for locking the pan and cover so as to prevent the cake or loaf from unauthorized removal as more fully hereinafter set forth.

With these objects in view my invention consists in the combination with the pan, of a false bottom, adapted to fit within the bottom, and means for lifting the same, with the superimposed cake bodily from the pan; the lifting devices also serving as parting devices for separating the cake or loaf from the sides of the pan.

The invention also consists in the combination with the pan, of a cover, preferably in the form of an inverted pan, swiveled upon a vertical standard attached to one side in such manner as to be adjustable vertically over the same, and provided with a hasp at one edge, adapted to be fastened over a staple attached to the pan to lock the parts as will more fully hereinafter appear.

The above mentioned objects are attained by the means illustrated in the accompanying drawings, in which;—

Figure 1 represents a perspective view of the lifting and parting device detached from the pan. Fig. 2 represents a vertical sectional view of the pan and cover, taken through the standard and cover and the locking devices, and showing the parts in a locked position. Fig. 3 represents a transverse vertical sectional view of the lifting device, showing the lifting arms in position, diametrically opposite each other, and Fig. 4 represents an inverted plan view of the lifting device.

Referring to the drawings by letters;—A indicates a baking pan of the ordinary description, and B a false bottom of such size as to fit upon and cover the bottom of said pan. The said false bottom on its under side has swiveled to its center by means of a rivet C or otherwise, the inner ends of two straps D preferably of sheet metal which are extended to the edge of the false bottom, then turned upwardly so as to follow the inclined sides of the pan, and extended upward to a point above, where they are bent outwardly at the points indicated by the letter E, then extended upwardly a suitable distance and again bent downwardly, forming loops for the ring handles F the downwardly extending parts being fastened to the upwardly extended portions, and carried down below the bend of said upwardly extended portion, and curved outwardly at G to form spring clamps which will automatically close over the edge of the pan when the device is inserted, to hold the device in place, while permitting its ready removal.

The letter H indicates a vertical cylindrical standard secured by a bracket I to one side of the pan as shown in Fig. 2 of the drawings.

K indicates the cover of the pan, which may for convenience and cheapness, be a counterpart of the said pan. The cover at one side is provided with a bracket I having a socket M which fits over the cylindrical standard N the bracket having its sides slightly parted, between the cylindrical portion in socket, and base, so as to cause the socket to spring upon the standard to permit it to remain in an adjusted position thereon. The socket may be provided with a set screw for the same purpose, or with a leg P by means of which it may be moved up and down to adjust the cover.

The letter R indicates a staple secured to the edge of the cover, diametrically opposite the socket, or other convenient point and S a hasp pivoted to a corresponding part at the edge of the pan, in such position that the parts may be interlocked when the cover is down and fastened by a padlock.

It will be seen that the pan and cover may be of the ordinary form of cake pan found in the market, and are preferably cylindrical in shape so as to permit the lifting straps to be turned, to part the cake at the sides, but it is evident that the lifting device as well as the cover may be applied to pans of different shapes without departing from the essence of my invention. It is further evident that all of the parts of the device may be constructed economically of sheet metal such as the ordinary tinned sheet iron, for instance.

When using the pan, the false bottom is inserted and the lifting straps secured over the sides of the pan. The dough or batter is then placed in the pan, the cover secured upon the standard and the whole placed in the oven as usual. During the baking the cover may be adjusted over the pan so as to cause the the upper crust of the cake or loaf to bake evenly. When baked, the cake or loaf may be removed bodily by raising the lifting device. Until required for use the parts may be locked to prevent the unauthorized abstraction of the cake.

Having described my invention what I claim as new and desire to secure by Letters Patent thereon, is;—

1. The combination with a baking pan, of a false bottom, having metallic strips pivoted at their ends to the center of its under side, and extended to its edge, and from thence upward, forming lifting handles and parting devices, substantially as specified.

2. The combination with a false bottom adapted to fit within a pan, of the metallic strips secured to the lower side of said bottom, extended upwardly and bent as described to form clamps to secure the device to the pan, substantially as and for the purpose described.

3. The combination with the false bottom, and the strips secured to the lower side, and bent as described, of the ring handles secured within the upper bends of the strips, substantially as specified.

4. The combination with the pan and its vertical standard, of the cover provided with a socket at one side adapted to adjustably fit the standard to hold the cover in an adjusted position over the pan, substantially as specified.

5. The combination with the pan, supporting standard, and cover, having a socket at one side fitted on the standard whereby the cover is adjustably secured above the pan, of the hasp and staple whereby the parts are adjusted to be fastened together, all constructed and arranged to operate substantially as described.

In testimony that I claim the foregoing as my own I affix my signature in presence of two witnesses.

AUGUSTA RAMMEL.

Witnesses:
PHILIP F. LARNER,
JAMES R. MANSFIELD.